W. K. MILLHOLLAND.
CHUCK.
APPLICATION FILED MAR. 6, 1917.

1,263,270.

Patented Apr. 16, 1918.

Inventor
William K. Millholland

By Lockwood & Lockwood
Attorneys

UNITED STATES PATENT OFFICE.

WILLIAM K. MILLHOLLAND, OF INDIANAPOLIS, INDIANA.

CHUCK.

1,263,270.

Specification of Letters Patent. Patented Apr. 16, 1918.

Application filed March 6, 1917. Serial No. 152,580.

*To all whom it may concern:*

Be it known that I, WILLIAM K. MILLHOLLAND, a citizen of the United States, and a resident of Indianapolis, county of Marion, and State of Indiana, have invented a certain new and useful Chuck; and I do hereby declare that the following is a full, clear, and exact description thereof, reference being had to the accompanying drawings, in which like letters refer to like parts.

The object of this invention is to enable the chuck to be used on work which is held in a machine and where the collet of the chuck can not be employed if it has longitudinal movement beyond the face of the chuck, as heretofore. Thus where the work has on it a collar or like extension that will also prevent the use of the chuck with a collet having longitudinal movement, at least beyond the face of the chuck. This is often the case, and the object of this invention is to provide a chuck which can be used with all kinds of accurate work, and without modifying or adjusting positions of other parts of the lathe or machine.

The chief feature of the invention, therefore, consists in providing a chuck with a collet which does not have any longitudinal movement, either during its contraction or its expansion. The chuck is contracted by a wedge shaped annular closer which is located behind and surrounds the main part of the collet and is longitudinally movable and has an internal beveled face which coöperates with an external beveled face of the collet, so that the closer when it is moved outward will contract the collet and thereby clamp the work. Hence this chuck will grasp and hold the work without any longitudinal movement of the work and it is accomplished by arranging the collet so that it has no longitudinal movement and does not project beyond the base of the chuck.

The full nature of the invention will be understood from the accompanying drawings and the following description and claims.

Figure 1:
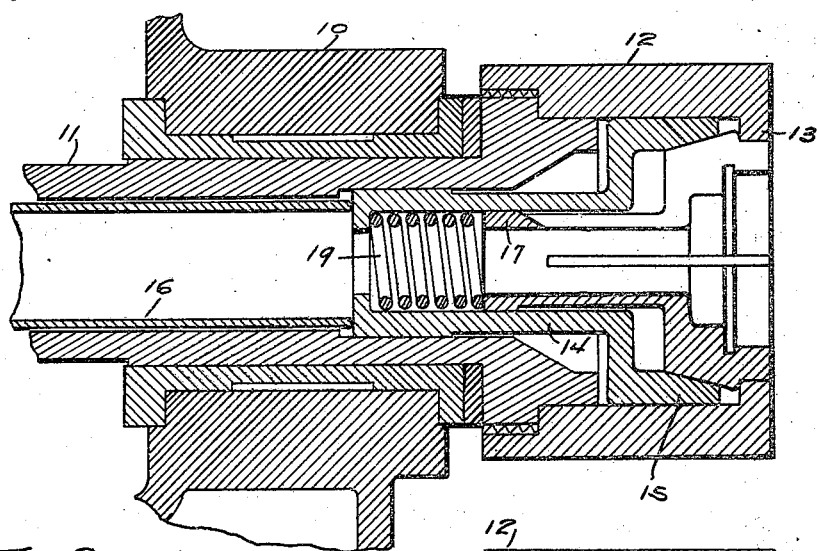
Figure 2:
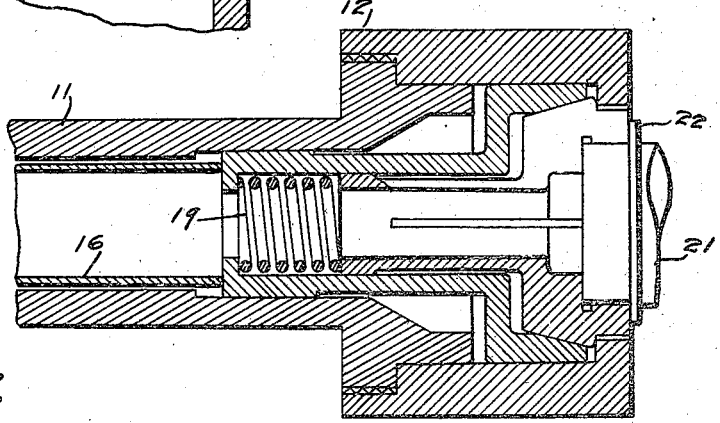
Figure 3:
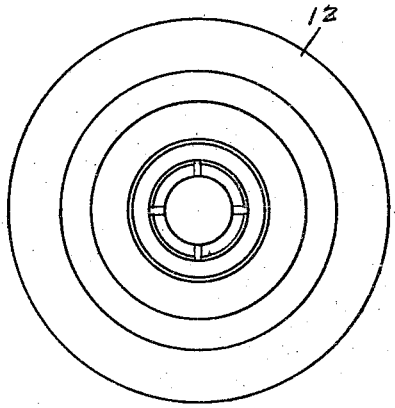
Figure 4:
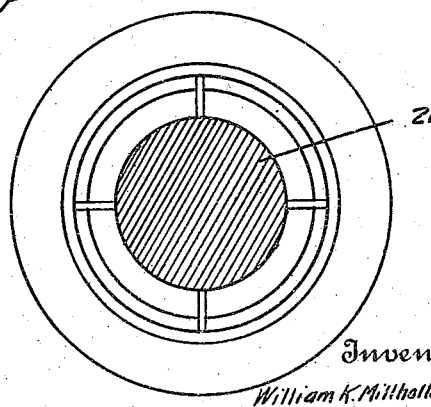

Figure 1 is a central longitudinal cross section through the chuck on line 1—1 of Fig. 4 showing the chuck secured in a lathe bearing. Fig. 2 is the same as Fig. 1 with parts removed showing the chuck in clamping position with a piece of work clamped therein. Fig. 3 is a cross section on the line 3—3 of Fig. 2. Fig. 4 is a cross section on the line 4—4 of Fig. 2.

In the drawings there is shown a lathe having a central bearing 10 which engages and holds in position the spindle 11 of the chuck. The outer end of the spindle is enlarged and has secured thereon a hood or cap 12 which is provided with an inwardly turned annular flange 13. Seated within said spindle there is a closer 14 which is provided with a slidable tubular portion on the inner end and an outwardly flaring closing member 15 on the outer end. Said member 15 is annular and is provided with an inwardly beveled surface which is adapted to engage the collet or jaws for causing them to close, as will be hereinafter described.

Slidably mounted within the spindle 11 there is a tubular pusher 16 which is operated by means not shown herein to act against the closer 14 for forcing it into engagement with the collet. The collet 17 is adapted to be slidably engaged by the tubular portion of the closer and has outwardly extending jaws 17 on the outer end thereof. The jaws of the collet are provided with the annular shoulders 18 which engage the annular flange 13 so as to prevent their longitudinal movement in an outward direction. They are further provided with externally beveled surfaces which are engaged by the internally beveled surface of the closer. The collet is split longitudinally, preferably in four places as shown in Fig. 4, so that the jaws may be contracted by the movement of the closer. Within the tubular portion of the closer there is a spiral spring 19 which lies between the inner surface of said closer and the inner end of the collet, so that when the pusher is released the spring will force the closer rearwardly so as to relieve the collet and permit the jaws to spring back into normal position, thereby relieving the work which they are adapted to grip. The jaws of the collet are provided with an annular groove 20 to take care of any uneven surface on the end of the work to be held. Fig. 2 shows the work 21 which has a flange 22 thereon which would prevent its being gripped and held in place by the ordinary collet, secured in operating position by the jaws.

It will be readily seen, therefore, that the construction of the chuck as above described prevents any longitudinal movement of the collet, so that the exact position of the work will be maintained. Furthermore the operation of the collet without any longitudinal movement enables the chuck to be used on work having a flange or other irregularities of surface which would prevent a chuck, necessarily having longitudinal movement in order to grip the work, from being used thereon.

The invention claimed is:

1. A chuck having a spindle, a hood secured on said spindle, a closer slidably mounted in said spindle, means for operating said closer, a collet slidably mounted in said closer having externally beveled jaws thereon adapted to be engaged and clamped by said closer, means on said hood for engaging said collet and preventing any longitudinal movement thereof, and a spring within the tubular portion of said closer having one of its ends bearing against an inwardly projecting portion of the end of the closer and its opposite end against the inner end of the collet for returning said closer to normal position after having been operated.

2. A chuck having a spindle, a hood secured on said spindle, a closer slidably mounted in said spindle, said closer comprising a tubular portion having an inwardly extending flange at its inner end and an outwardly flaring portion at its outer end, means for operating said closer, a collet slidably mounted in said closer and having externally beveled jaws thereon, adapted to be engaged by said closer so as to clench on the work to be held, shoulders on said jaws, an inwardly extending annular flange on said hood adapted to engage said shoulders for preventing any longitudinal movement thereof, and a compression spring within said tubular portion of said closer adapted to engage the flange of the closer and the inner end of the collet so as to return the closer to its normal position after having been operated.

3. A chuck having a spindle, a hood secured on said spindle, a closer slidably mounted in said spindle, said closer having a tubular portion, and a flange at one end of the tubular portion, an inwardly beveled surface on said closer, means for operating said closer, a collet extending within said closer and having outwardly flaring jaws thereon, outwardly beveled surfaces on said jaws, said jaws having an annular groove, shoulders adjacent said surfaces, an inwardly extending flange on said hood adapted to engage said shoulders for preventing the outward movement of said collet, and a spring within the tubular portion of said closer and bearing respectively against the inner end of said collet and the flanged end of said closer for forcing said closer inwardly to its normal position when relieved by the pusher, thereby releasing said jaws and permitting the collet to release the work held thereby.

In witness whereof, I have hereunto affixed my signature.

WILLIAM K. MILLHOLLAND.

Copies of this patent may be obtained for five cents each, by addressing the "Commissioner of Patents, Washington, D. C."